Patented Feb. 10, 1942

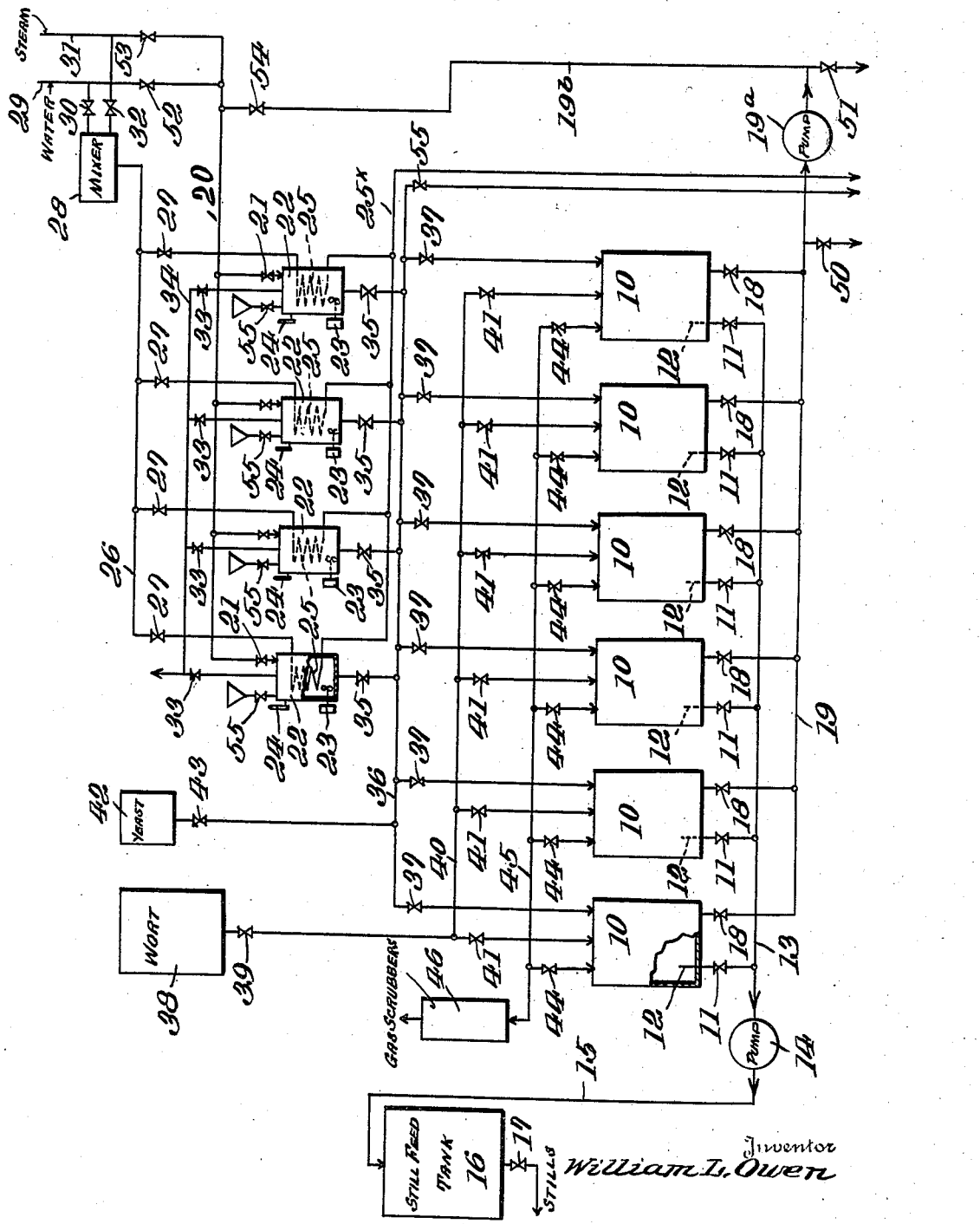

2,272,982

UNITED STATES PATENT OFFICE 2,272,982

PROCESS FOR INCREASING FERMENTATIVE EFFICIENCY IN ETHANOL PRODUCTION

William Ludwell Owen, Baton Rouge, La.

Application July 19, 1938, Serial No. 220,142

3 Claims. (Cl. 195—37)

In the ethanol fermentation of mashes prepared from molasses or amylaceous materials as grains, tubers, wood pulp wastes or other sources, it is usually assumed that, in the natural propagation of the yeast, there is a sufficient formation of enzymes to insure a rapid and complete fermentation. It has been the general belief also that the rapidity of the fermentation in the above cases is limited only by the rate of availability of the sugars present, the rapidity with which the yeast increases, and the presence of adequate amounts of nutrient materials other than the carbohydrate sources of energy.

When it is remembered how complicated is the phenomenon of alcoholic fermentation reactions, and how varied and numerous are the enzymes that take part in it, it will be seen that an inadequacy of enzymes may account in large part not only for the initial "lag phase" of fermentation, but also for the incomplete exhaustion of the sugars present in the mash, due to the lack of adequate amounts of enzymic potential in the final phases of the fermentation period.

In ethanol fermentation, there are both preparatory and fundamental enzymic actions. The preparatory work depends on those enzymes capable of producing the changes in the substrata which result in the formation of fermentable sugars from the higher saccharides. In this category we have sucrase or invertase, which forms fermentable hexose sugars from the disaccharide sucrose; and also raffinase which breaks down raffinose into sugars that can be utilized by the yeast. In the fundamental enzymes in ethanol fermentation, we have those that may be regarded as principal, and others which may be regarded as incidental to the primary reaction. In the first of these categories we have the zymase of Buchner which can induce active ethanol fermentations from sugars independently of the presence of the living yeast cell. While the term zymase perhaps covers all of the incidental enzymes involved in the ethanol fermentation, we know of the existence of reductases, oxydase, and hexosephosphatase, which perform an indispensable function in ethanol fermentations.

With reference to the fermentation of molasses mashes, it has been found that the addition of enzymic preparations prepared from the sedimentary yeast obtained from the bottom of distillery fermenters leads to a consistent increase in the total amount of alcohol produced by yeast fermentation as compared with that of the control or untreated mashes.

It has been found, moreover, that this increase in fermentation efficiency cannot be duplicated by any other treatment which the molasses mashes may be given. For example, no such commensurate increases may be obtained from increasing the nitrogenous ingredients of the mashes, nor do any additions of phosphates accomplish the same purpose. The benefits obtained must be attributed to the enzymogenic content of the added material.

The term "enzymogenic material" may be defined as consisting of those substances which give rise to the elaboration of active enzymes in the cells of living plants. In view of the fact that enzymes are constituted largely of albuminous substances, in which are incorporated minute amounts of metal catalysts, their elaboration depends not only upon the presence of adequate sources of nitrogen, but largely upon the form in which this nitrogen exists in the substratum in which the cells of the plant or microorganism are propagated.

It has been found that autolyzed yeast cells, prepared from the sedimentary yeast from the bottom of fermenters in molasses distilleries, constitute an excellent and economical source of this enzymogenic material, and that its addition to fermenting mashes such as those from molasses greatly increases the yield of alcohol obtained from their fermentation.

It has also been found that molasses frequently is lacking in some of the rarer elements of nutrition such as manganese in particular, and that only by the addition of minute traces of this substance can efficient fermentations be obtained. In rarer instances the addition of minute traces of copper have been found to increase the rate and the final efficiency of fermentation of molasses.

Small amounts of such autolyzed yeast, when added to molasses mashes, not only supply the necessary "enzymogenic material," but also insure the presence of those rarer elements whose absence may frequently reduce the efficiency of fermentation of molasses mashes.

Further, it has been found that one of the benefits derived by adding this "enzymogenic matter" to a mash prior to its seeding, is that of creating an environment favorable to the immediate propagation of yeast cells, and reducing the so called "lag phase" of fermentation. This may be due to the electric charge imparted to the mash by the autolyzed yeast cells, or it may be a result of the colloidal nature of the degraded cellular material which furnishes an ideal environment for the immediate yeast development.

It is also very significant that in the fermentation process using autolyzed yeast, higher yields of alcohol are obtained along with a smaller development of the yeast used in carrying out the fermentation. This fact contributes to the explanation of the higher efficiencies obtained, since less of the carbon in the sugars is utilized in building up cell structure and a correspondingly larger amount in the production of metabolic products.

An additional advantage, quite apart from the preparation of the "enzymogenic material," and its subsequent use as an accelerator of fermentation, is the practical means the process affords for the conservation of the alcohol in this sedimentary material.

It is the usual practice in molasses distilleries to discharge, to the sewer, or waste, the sedimentary material on the bottom of the fermenters, at the time that the beer is sent to the stills. It has been found that this material may entrain considerable quantities of alcohol and, depending upon the volume of the sediment and the capacity of the fermenters, this may amount to from 10-50 gallons of alcohol for each fermenter distilled.

In the present process, this alcohol is recovered by recycling it in the process, and recovering the entrained alcohol from the distillation of the subsequent mashes.

Furthermore, by the recovery of the alcohol and the increased efficiency obtained from the use of the autolyzed sediment, it is feasible to discard, into the autolyzing process, slightly larger volumes of the sediment, and thus eliminate the harmful effects of carrying the upper layers of this sediment to the stills as is now the case.

Having described the fundamental purposes of this invention, its practice may be illustratively described:

1. Preparation of the autolyzed yeast

In preparing the enzymogenic matter, the copious precipitate of sedimentary yeast which collects as a thick mass on the bottom of fermenters in distilleries is drawn off into drums or washed into receiving tanks or collected from the screen at the beer preheater. It is placed in closed receptacles, and chloroform or toluene added at the rate of 500-1000 ccs. per 100 gallons of yeast suspension. Upon the addition of the chloroform, the yeast begins slowly to undergo autolysis, the cell walls begin to dissolve and disintegrate; and finally on complete autolysis, the suspension becomes limpid and dark, and few normal yeast cells may be observed under the microscope. It is caused to autolyze at a temperature of say 50 to 60 degrees C., and is ready for use within from 24 to 72 hours; it may be kept indefinitely as long as the chloroform is renewed as lost from evaporation.

2. Fermentation of the wort

The mash is prepared in the ordinary way, and from 0.5 to 2.0 percent by volume of the autolysate is added, either after the tub or fermenter is filled, or preferably simultaneously with the seed yeast. It is usually unnecessary to add any other nitrogenous or phosphatic material as the yeast autolysate will supply all of these ingredients that are required. The fermentation is then allowed to proceed as under ordinary conditions.

The apparatus shown on the attached sheet indicates the assembly of parts for practicing an ethanol fermentation in one illustrative form according to the present invention. In this apparatus, six fermenter tanks are employed in conjunction with four autolysis tanks.

The fermenters 10 are employed for the fermentation proper. At the end of fermentation in a particular fermenter 10, the contents of the fermenter are allowed to settle so that the yeast subsides to the bottom, and then the corresponding valve 11 is opened, and the beer is drawn off to the beer manifold 13 until the contents have been discharged down to a level established by the raised end of the standpipe 12. The beer passes through the manifold 13 to the beer pump 14 by which it is lifted through a beer line 15 to the still feed tank 16, from which it is discharged through the valve 17 to the various stills in the usual way.

The sediment remaining in the bottom of the fermenter 10 may then be withdrawn by opening the corresponding valve 18 and passed through the sediment manifold 19 to the sediment pump 19a by which it is lifted through a sediment line 19b to the sediment manifold 20. From this it is discharged through an opened sediment valve 21 into an empty one of the autolysis tanks 22.

These autolysis tanks 22 are provided with motor-driven agitators 23 and each has a thermometer 24 by which the temperature therein may be closely observed for purposes of regulation. The temperature within the autolysis tanks is maintained by coils 25 which are supplied with hot water from a hot water manifold 26, at rates determined by the valves 27. This hot water is delivered from a mixing tank 28 which receives water from the water supply main 29 through a control valve 30 and also receives steam from a steam supply main 31 through a control valve 32. The outflow from the coils 25 passes to a waste manifold 25x. The autolysis tanks are vented through the control valves 33 and vent main 34; it will be understood that appropriate filter means (not shown) are employed to prevent the passage of infective matter back through this venting main.

When the autolysis has proceeded to the desired degree in a particular tank, and a fermenter is to be started in operation, the corresponding autolysate discharge valve 35 is opened so that the autolysate flows into the manifold 36, which in the illustrative form is employed both as an autolysate manifold and as a yeast manifold. From this manifold 36, discharge can occur into the desired fermenter 10 by opening the appropriate valve 37.

In preparing the wort for the fermenter tank 10, the ingredients can be assembled in a wort supply tank 38 in which they may be suitably sterilized and acidified and then delivered through the valve 39 to the wort manifold 40 and thence by the appropriate valve 41 into the desired fermenter 10. Similarly a pure yeast culture in the yeast tank 42 is delivered through the valve 43 into the common manifold 36 and thence moves into the selected fermenter 10.

During the course of fermentation, carbon dioxide gas is permitted to flow from the operating fermenters 10 through valves 44 into a gas manifold 45 and thence passes through the gas scrubber 46 and is removed for employment as desired.

The fermenters 10 can be rinsed or scrubbed with water, if desired, with discharge through the corresponding valve 18 and sediment manifold 19, the rinsing being discharged to waste by opening the valve 50, or may be moved by the pump 19a through the waste valve 51.

The piping systems, likewise, can be rinsed or sterilized by appropriate opening of the water valve 52 or the steam valve 53 so that steam, or water at a desired temperature, is introduced into manifold 20. By shutting down the pump 19a and opening the valves 54 and 51, the line 19b can be cleaned or sterilized: while by closing the valve 54 and opening the desired valve 21, a particular autolysis tank can be similarly treated, discharging therefrom to the common manifold 36 and thence through a fermenter 10 which is similarly being cleaned, or through a valve 55 directly to waste.

The following illustrations show examples of the increase in fermentation efficiency derived by this invention.

In testing the results of the addition of yeast autolysate upon the efficiency of the fermentation of molasses, the following results were obtained:

| No. Exp. | Kind of molasses | Eff. control | Max. efficiency from autolysate | Incr. | Conc. |
|---|---|---|---|---|---|
| | | | | | Percent |
| 1 | High test P. R. | 83.94 | 85.07 | 1.1 | ¼ |
| 2 | do | 82.8 | 87.51 | 4.7 | ½ |
| 3 | do | 82.8 | 86.2 | 3.4 | ½ |
| 4 | do | 83.94 | 87.51 | 3.6 | ½ |
| 5 | do | 86.19 | 88.63 | 2.5 | ½ |
| 6 | Cuban B. S. | 84.56 | 86.8 | 2.3 | ½ |
| 7 | Louisiana B. S. | 85.63 | 90.3 | 4.7 | ¼ |
| 8 | Beet molasses | 83.8 | 88.8 | 5.0 | ¼ |

Assuming a yield of from 85 to 100 gallons of proof spirits per 100 gallons of molasses or from its equivalent 600 gallons of mash, by the use of three gallons of autolysate on the above volume of mash we obtain an increase of efficiency equivalent to 1.6 gallons of 100 percent alcohol. This increased yield would represent a value of 52 cents or approximately 17 cents per gallon of autolysate employed for the above purpose.

It has been found, on an average of a great many tests, that the value of this enzymogenic material, in terms of increased yields of alcohol, is approximately 17 cts. per gallon. It is obvious, since the yeast sediment is a waste product and otherwise valueless and since the chloroform in the product can if desired be recovered by distillation, that the process represents a valuable innovation in distillery procedure.

An additional advantage, and one which contributes to the profits of the process, is that it dispenses with the need of using salts of ammonia or of phosphoric acid, although the former has been regarded as essential and the latter frequently found to be quite necessary in order to obtain satisfactory yields from molasses from certain sources.

It has moreover been found that, owing to the colloidal nature of this yeast autolysate, it acts as a buffer to the acids formed during fermentation, and thus serves as a protection, to the seed yeast, from the acids that may be formed by bacterial action during the course of fermentation. It also acts as a buffer to the acidification of the mashes, and minimizes the harmful effects of too large additions of sulphuric acid.

The advantage of the latter may be easily appreciated when it is understood that the acidification of molasses is usually carried out on the conventional basis of one part per thousand, that is, one gallon of acid per one thousand gallons of mash. However, various runs of molasses vary greatly in their acid requirements, some tolerating much less than the conventional demands. In the latter case, the efficiency of fermentation would be greatly impaired unless there were present at the time some buffering material such as the yeast autolysate above described.

It has been repeatedly observed in the laboratory that the total loss of weight in flasks to which this material is added is less than in the controls, thus indicating that there is less carbon dioxide gas given off per unit of alcohol produced than in the case of these fermentations in the absence of this material. This indicates a lesser degradation of the sugars, and a greater valuable yield.

Parts of the autolyzed material appear to act as a coenzyme, and as a source in particular of hexosephosphatase, whose presence is essential in the utilization of phosphates and their liberation in the cycle of changes which these substances undergo in the fermentation of sugars by yeast.

To illustrate the economy in cell multiplication in molasses mashes to which varying amounts of autolyzed yeast are added, the following numbers of yeast cells per cc. have been counted after 72 hours.

A   No autolysate _____ 36,000,000
D   0.5% by vol. and 0.25% by vol___ 25,600,000
E   0.5% _____ 28,400,000
F   1.0% _____ 20,500,000
G   2.0% _____ 28,400,000
H   2.0% (heated) _____ 22,240,000

It has moreover been found that this increase in fermentation efficiency is not obtainable merely by the addition of the autolysate to the seed mash in which the yeast is propagated, but it must be present, for the enzymogenic effect, in the main fermentation process.

While molasses has been taken as an example of the role played by "enzymogenic matter" in the alcoholic fermentation of sugars for the production of ethyl alcohol on an industrial scale, the procedure is applicable to other sugar- or starch-bearing materials. Further, molasses generally is a much more easily fermented substance than are other products, which are sometimes used for industrial alcohol manufacture (notably waste sulphite liquors in paper manufacture, or sawdust, or juices from Maguey and other fibre bearing plants). In these latter cases the addition of autolyzed yeast is the only means of insuring the presence of adequate amounts of assimilable enzymogenic material.

It has been found advantageous and economical to limit the course of the autolysis to a time of say 24 hours, as this results in the production of a sufficient quantity of autolysate products comprising immediately available enzymes, chemical nutrient matter, and mechanically-effective substrate ingredients for the yeast operations, without demand for a large storage capacity for the sediment or autolysate. This naturally requires the addition of a larger relative quantity of autolysate, but such quantity can be obtained in the conduct of cyclic fermentations of the present nature. Since the sediments from the successive cycles contain increasing quantities of autolysate products such as cell structures produced in preceding operations, a type of exhaustion sometimes appears; when this occurs, a limitation can be placed upon the number of cycles through which any sediment may be run. For example, six cycles each including an autolysis phase and a fermenting phase may be employed, allowing a fermentation period of 38 hours. When this is established in cycle with a given commercial apparatus, such as that indicated on the flow sheet with six fermenters and four autolysis vessels, each fermenter can be given an "off" period every two weeks, during which time appurtenant parts of the system can advantageously be thoroughly cleansed and sterilized, and a succeeding operation of yeast propagation with fermentation accomplished therein; and the yeast sediment thereof then employed as the starting material for a succeeding repetition of cycles including autolysis.

It will be understood that the invention is not limited to the specific practice set out in the illustrative example, and that means such as filtration or centrifugal separation of the entire contents of the fermenter may be employed for obtaining the sediment separate from the beer, prior to the autolysis.

I claim:

1. A cyclic process of fermenting molasses mashes by yeast to produce ethanol, comprising drawing off the beer from the settled body of a first fermenting operation and terminating said withdrawing operation prior to any substantial passage of yeast sediment with the beer whereby the retained portion of the body comprises both yeast sediment and beer, effecting autolysis of the yeast in the presence of the retained beer, the temperature during autolysis being kept below substantially 60 degrees C., and adding the entire autolysate including the solid and liquid components and the retained beer to the molasses mash of a second fermenting operation substantially at the time of seeding with yeast, whereby to reduce the lag phase in the second fermenting operation and to supply nutrient to the yeast therein and to effect recovery of ethanol in the retained beer.

2. A cyclic process of successively fermenting carbohydrate mashes by yeast to produce ethanol, comprising collecting the yeast from a first fermenting operation, effecting autolysis of the yeast in the presence of an antiseptic and at an elevated temperature not exceeding substantially 60 degrees C. whereby to retain enzymatic matters in active condition, and adding the entire autolysate product including both liquid components and degraded cellular matter to the mash for a second fermenting operation substantially at the time of seeding with yeast.

3. A cyclic process of fermenting molasses by yeast to produce ethanol, comprising preparing a molasses wort and including an acidification thereof, mixing said yeast and an autclysate with the wort, said autolysate being the entire product obtained by effecting autolysis of the yeast sediment from a preceding like fermentation and said autolysate containing the enzymatic and other matters produced by autolysis at an elevated temperature not exceeding substantially 60 degrees C. and including degraded cellular material, effecting fermentation of the molasses wort by said yeast in the presence of the autolysate whereby the autolysate provides enzymatic and nutrient matter and degraded cellular material and is effective for buffering the acidity, and drawing off the beer from such second fermentation.

WILLIAM LUDWELL OWEN.